United States Patent [19]
Saegusa et al.

[11] Patent Number: 5,123,042
[45] Date of Patent: Jun. 16, 1992

[54] CORDLESS TELEPHONE APPARATUS WHICH AVOIDS SIMULTANEOUS CONNECTING UNIT/CORDLESS TELEPHONE CALL CONFLICTS

[75] Inventors: Noboru Saegusa, Tokyo; Naoyuki Kohyama, Saitama, both of Japan

[73] Assignee: NEC Corporation, Tokyo, Japan

[21] Appl. No.: 605,500

[22] Filed: Oct. 30, 1990

[30] Foreign Application Priority Data

Oct. 31, 1989 [JP] Japan .................. 1-283846
Nov. 22, 1989 [JP] Japan .................. 1-304305

[51] Int. Cl.⁵ .......................... H04M 11/00
[52] U.S. Cl. ........................ 379/61; 379/63
[58] Field of Search ........... 379/58, 61, 63; 455/54

[56] References Cited
U.S. PATENT DOCUMENTS 4,574,164 3/1986 Orikasa .................. 379/61
4,856,083 8/1989 Makino .................. 379/61

Primary Examiner—James L. Dwyer
Assistant Examiner—Dwayne D. Bost
Attorney, Agent, or Firm—Laff, Whitesel, Conte & Saret

[57] ABSTRACT

A cordless telephone apparatus having a connecting unit and a cordless telephone set. The apparatus processes a connecting unit call signal sent from the connecting unit and an originating call signal sent from the telephone set by giving priority to either one of the two signals. In a preferred embodiment which gives priority to originating call processing, the connecting unit stops sending a connecting unit call signal and, instead, sends an originating answer signal when an originating call signal with a coincident identification signal is detected during the course of transmission of the connecting unit call signal. The telephone set also sends an originating call signal when a carrier with a coincident identification signal is received. In an alternative embodiment which gives priority to connecting unit call processing, the connecting unit sends a connecting unit call signal on receiving an originating call signal with a coincident identification signal. The telephone set, even during a call originating procedure, stops transmitting an originating call signal and, instead, sends a telephone response signal when it receives a connecting unit call signal with a coincident identification signal.

12 Claims, 10 Drawing Sheets

CORDLESS TELEPHONE APPARATUS WHICH AVOIDS SIMULTANEOUS CONNECTING UNIT/CORDLESS TELEPHONE CALL CONFLICTS

BACKGROUND OF THE INVENTION

The present invention relates to a cordless telephone apparatus and, more particularly, to a cordless telephone apparatus having a connecting unit connected to a telephone channel and a cordless telephone set connected to the connecting unit by a radio channel, a wire telephone set being also connected to the telephone channel.

A cordless telephone apparatus has customarily been made up of a connecting unit connected to a telephone channel, or to subscriber line, and a cordless telephone set connected to the connecting unit by a radio channel. After either one of the connecting unit and cordless telephone set has determined that a carrier does not exist on a control channel, i.e., "NO CARRIER", an originating or a connecting unit call signal is sent over the control channel. Then, only if the other party which has receives the call signal determines that the identification signal of the cordless telephone set and one included in the originating or connecting unit call signal are coincident, a voice channel between the connecting unit and the telephone set is set up.

When a wire telephone set is connected in parallel to the telephone channel of the cordless telephone apparatus, an incoming call always causes the bell of the wire telephone set to ring before that of the cordless telephone set. As the user of the cordless telephone set who heard the wire telephone set ringing may off-hook the cordless telephone set before the connecting unit sends a connecting unit call signal, the cordless telephone set detects no carrier and thus commences a call origination. Consequently, a connecting unit call signal from the connecting unit and an originating call signal from the cordless telephone set conflict with each other. The conflict often causes both of the originating connection and the connecting unit connection to fail, resulting in loss connections.

SUMMARY OF THE INVENTION

An object of the present invention is to provide a cordless telephone unit which, when a connecting unit and an originating connection request conflict, processes either one of them prior to the other to thereby implement sure connection for communication.

In a preferred embodiment of the present invention, a cordless telephone set and a connecting unit of a cordless telephone apparatus have particular means for giving priority to call origination processing when a connecting unit and an originating call signal conflict, as follows. The connecting unit has means for interrupting, when an originating call signal with a coincident identification signal is detected during the course of transmission of a connecting unit call signal, the transmission of the connecting call signal and sends an originating answer signal to the telephone set to execute originating connection. The telephone set has means for sensing a carrier on a control channel on detecting off-hook while in a waiting state and, if the result is "NO CARRIER", starts on transmission. Even if the result is "CARRIER", the means starts on transmission when the telephone set has detected a connecting call signal with a coincident identification code, and then sends an originating call signal to the connecting unit. In this construction, the telephone set sends, even in a "CARRIER" condition, an originating call signal when it has detected a connecting unit call signal with a coincident identification signal, while the connecting unit sends an originating answer signal when it has detected an originating call signal during the course of transmission of a connecting unit call signal. As a result, an originating call signal and a connecting call signal from the telephone set and the connecting unit, respectively, are prevented from conflicting with each other.

An alternative embodiment of the present invention has the following means for giving priority to connecting unit call connecting unit processing when a terminating and an originating call signal conflict. Specifically, the connecting unit has connecting unit call signal priority sending means for sending a connecting unit call signal to the cordless telephone set prior to an originating answer signal sending procedure when, in the event of a connection attempt of a call, "CARRIER" is detected on the control channel and an originating call signal with a coincident identification signal is received from the telephone set. The telephone set has connecting unit call signal priority sending means for sending a telephone response signal prior to an originating connection procedure when, in the event of call origination and during an interval between the off-hook and the reception of an originating answer signal from the connecting unit, "CARRIER" is detected on the control channel and a connecting unit call signal with a coincident identification signal is received from the connecting unit.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENTS

Figure 1:
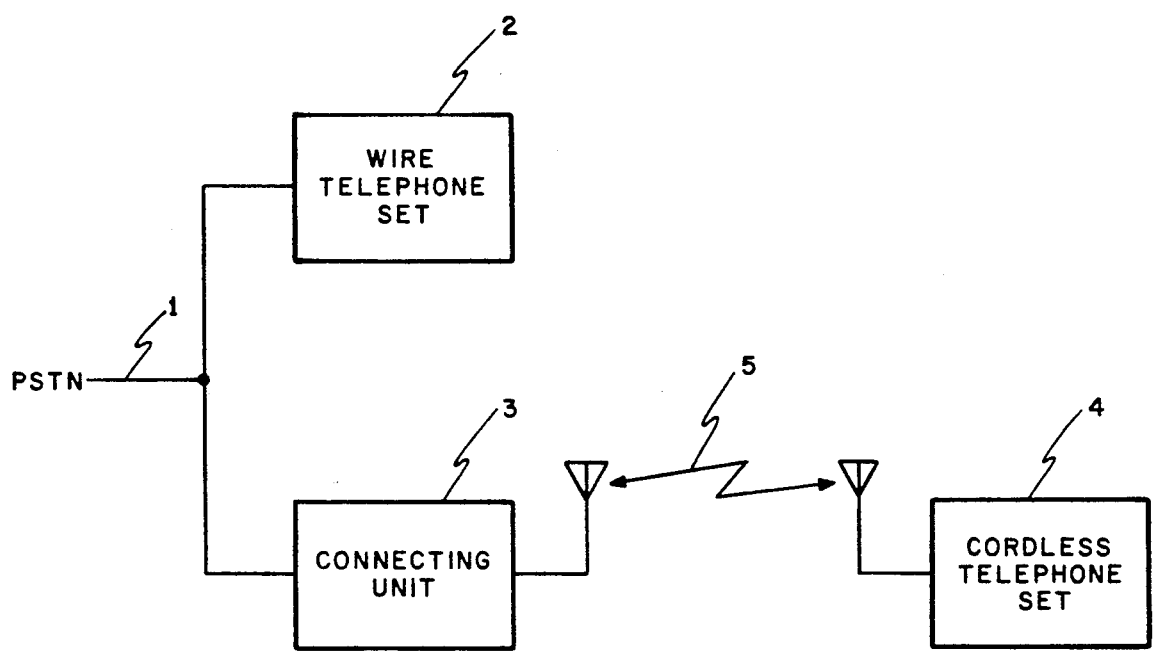
FIG. 1 is a schematic block diagram showing the connection of a wire telephone set and a cordless telephone unit.

Referring to FIG. 1 of the drawings, a cordless telephone apparatus embodying the present invention is shown. As shown, a wire telephone set 2 and a connecting unit 3 of the cordless telephone apparatus are connected in parallel to a public switching telephone network (PSTN) through a telephone subscriber line, or channel, 1. A cordless telephone set 4 included in the cordless telephone apparatus is connected to the connecting unit 3 by a radio channel 5.

Figure 2:
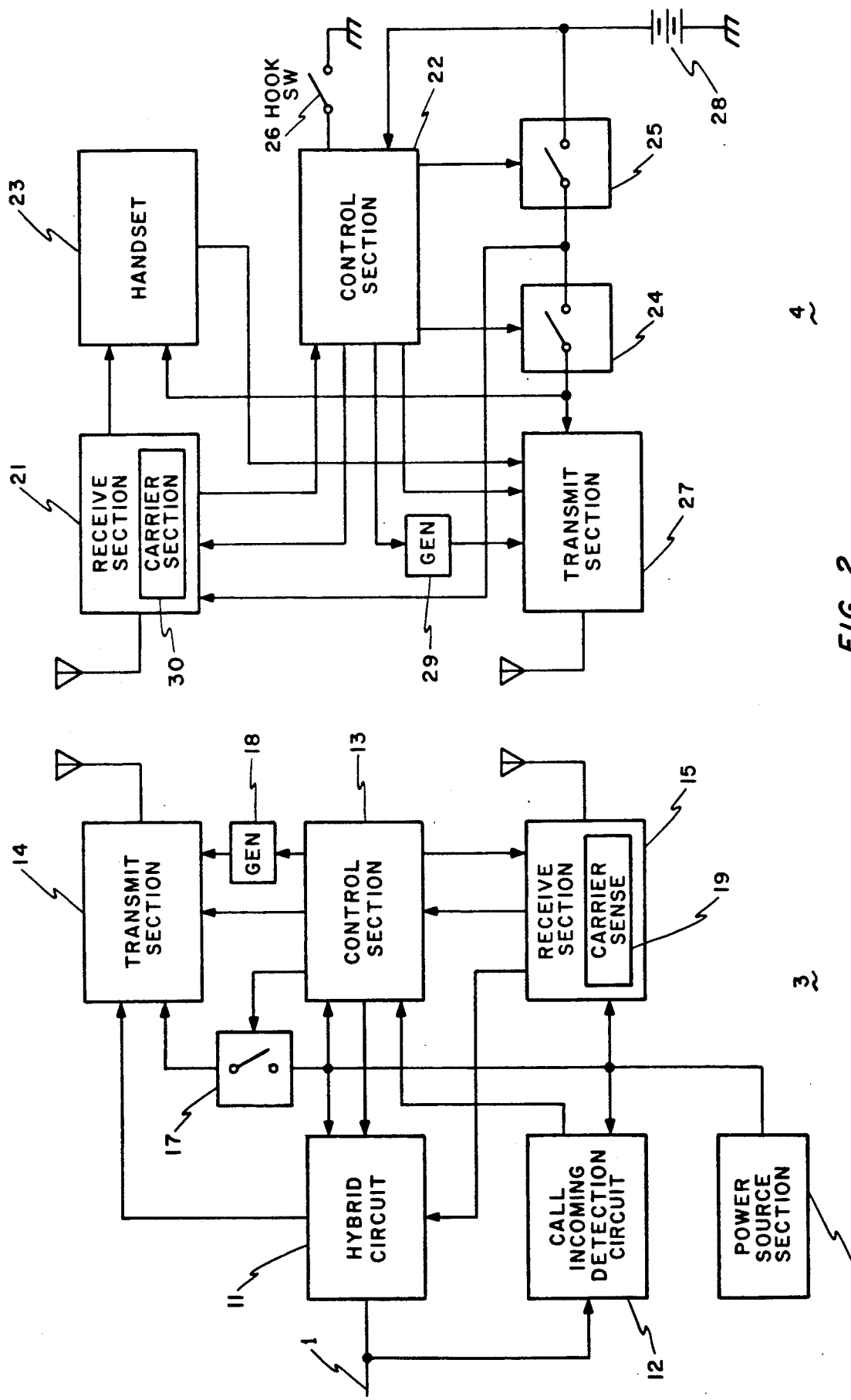
FIG. 2 is a schematic block diagram showing a connecting unit and a cordless telephone set, according to the present invention.

The cordless telephone apparatus will be described in more detail with reference to FIG. 2. As shown in FIG. 2, the connecting unit 3 has a hybrid circuit 11 connected to the telephone channel 1, a call incoming detection circuit 12 also connected to the telephone channel 1, a control section 13, a transmitting section 14, a receiving section 15, a power source section 16, a power switch 17, and a signal generating section 18. The receiving section 15 includes a carrier sensing circuit 19. The control section 13 controls the operations of the entire connecting unit 3. The transmitting section 14 converts a voice signal coming in over the telephone channel 1 and control signals generated within the connecting unit 3 (e.g., connecting unit call signal and originating answer signal) into radio signals. The receiving section 15 transforms a radio signal received from the cordless telephone set 4 over the radio channel into a wire signal. The signal generating section 18 generates the connecting unit call signal, originating answer signal, etc. The carrier sensing circuit 19 detects a received carrier level by comparing it with a predetermined reference level.

The cordless telephone set 4 has a receiving section 21, a control section 22, a handset 23, power switches 24 and 25, a hook switch 26, a transmitting section 27, a battery 28, and a signal generating section 29. The receiving section 21 includes a carrier sensing circuit 30. The receiving section 21 converts a radio signal received from the connecting unit 3 over the radio channel into a wire signal. The control section 22 controls the operations of the entire cordless telephone set 4. The handset 23 is adapted for the input and output of voice signals. The transmitting section 27 transforms a voice signal from the handset 23 and control signals generated within the telephone set 4 (e.g., originating call signal and telephone response signal) into radio signals and transmits them. The signal generating section 29 generates an originating call signal, a connecting unit call signal, etc. The carrier sensing circuit senses a received carrier level by comparing it with a predetermined reference level. When the telephone set 4 is in a waiting state, the control section 22 thereof turns off the transmission output by controlling the transmitting section 27 and turns the power switch 25 on and off, thereby remaining in a battery saving mode. The handset 23 and transmitting section 27 share a single power source for the sake of economy.

The carrier sensing circuits 19 and 30 each has a predetermined reference level and produces a "CARRIER" output if the received carrier level is higher than the reference level or a "NO CARRIER" output if otherwise.

Figure 3A:
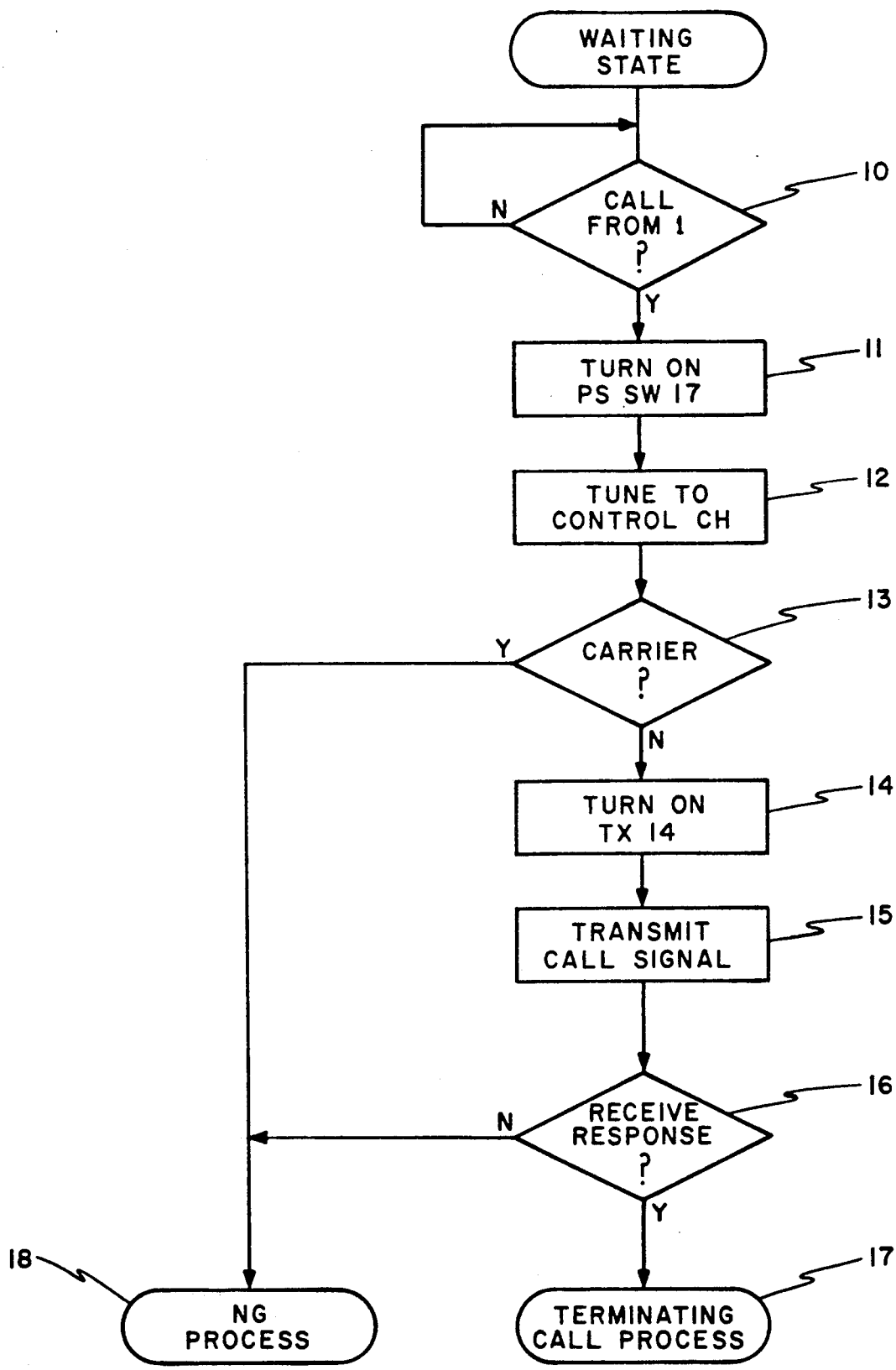
FIGS. 3A and 3B are flowcharts demonstrating connecting unit connection and originating connection executed by a conventional connecting unit and a conventional cordless telephone set, respectively.
Figure 3B:
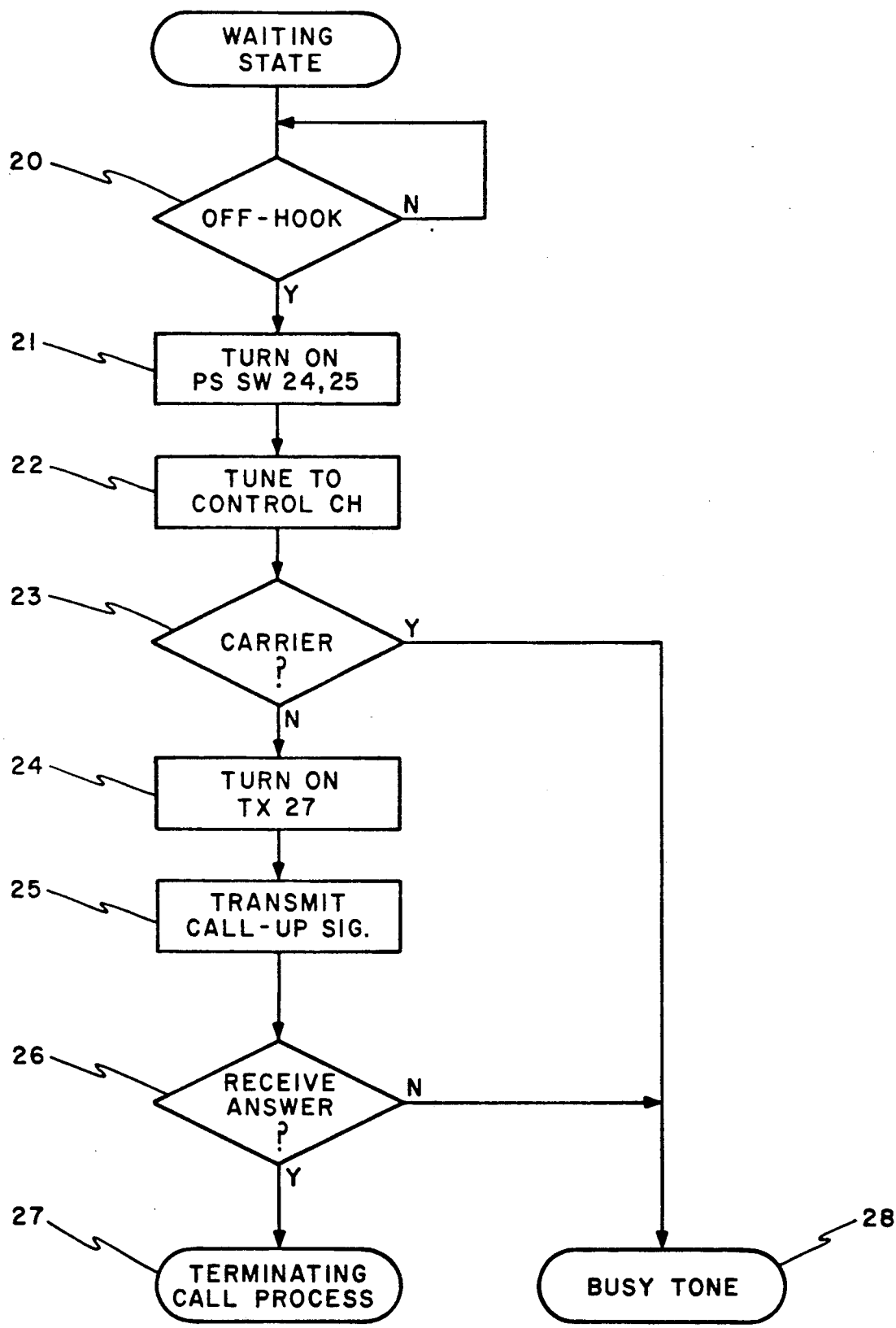

To better understand the present invention, the operation of a conventional cordless telephone unit will first be described referring to FIGS. 3A and 3B. While the conventional cordless telephone unit is similar in construction to the illustrative embodiment, the former is different from the latter regarding the connecting unit call control and origination control which are executed by the control section 13 of the connecting unit 3 and the control section 22 of the cordless telephone set 4, respectively.

Figure 4:
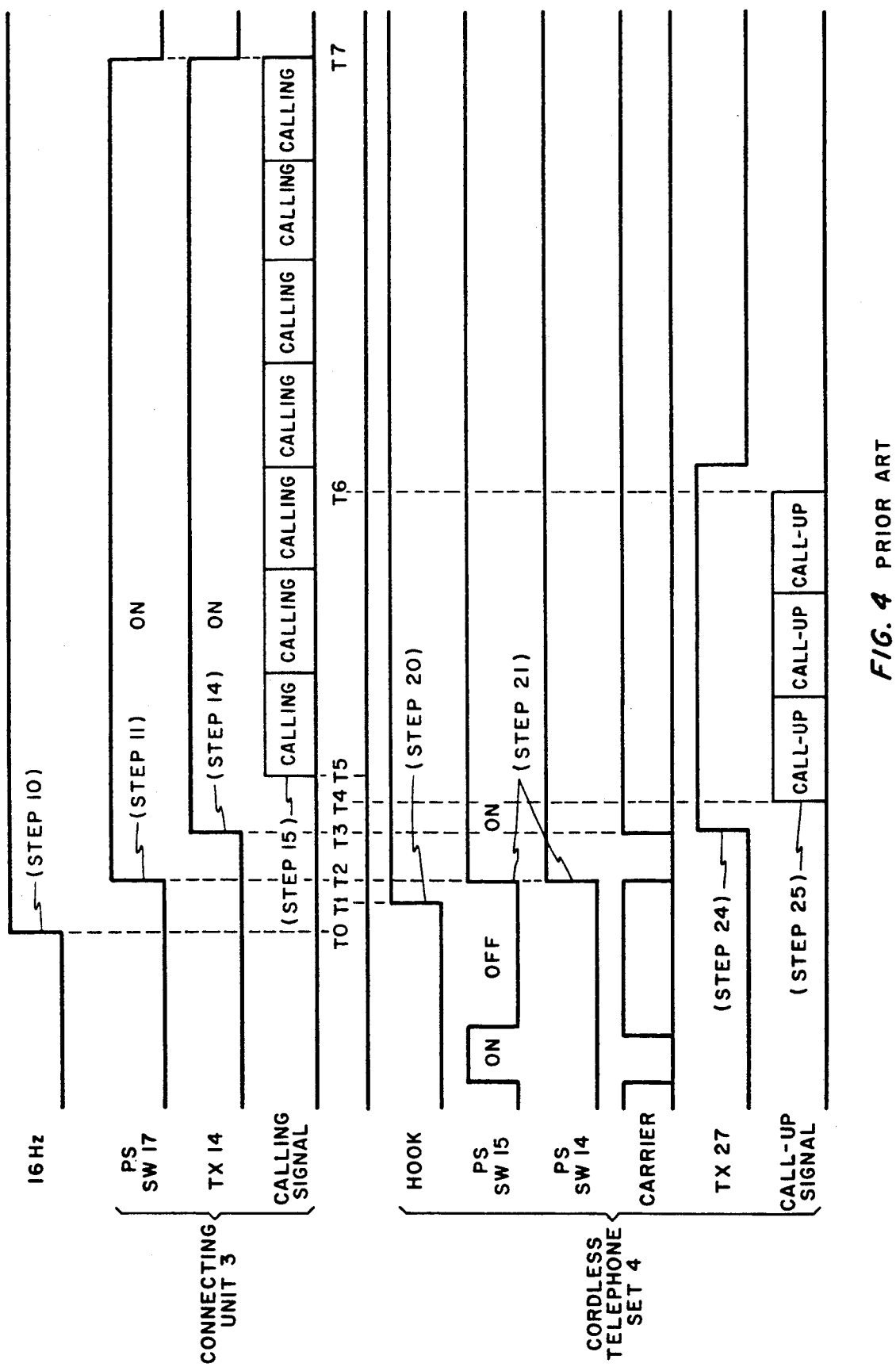
FIG. 4 is a timing chart representative of the conflict of a connecting unit call and an originating call occurring in the conventional arrangement.

To begin with, connecting unit connection particular to the conventional cordless telephone unit will be described with reference to FIGS. 3A and 4. Assume that the call incoming detective circuit 12 has detected a connecting unit call signal in the form of a sinusoidal wave whose frequency is 16 Hz (step 10, time T0) when the connecting unit 3 is in a waiting state. Then, the control section 13 turns on the power switch 17 (step 11, time T2). At the same time, the control section 13 designates, among a plurality of voice channels and control channels assigned to the cordless telephone unit, a single control channel (step 12) and tunes the transmitting section 14 and receiving section 15 to the designated channel. Thereafter, the carrier sensing circuit 19 checks the designated channel to see if a carrier exists thereon (step 13). If the carrier sensing circuit 19 produces a "NO CARRIER" output, the control section 13 turns on the transmitting section 14 (step 14, time T3) so as to send to the cordless telephone set 4 a connecting unit call signal including an identification signal of telephone set 4 (step 15, times T5 to T7). When the control section 13 receives a telephone response signal (step 16) after the transmission of the connecting unit call signal, it executes a connecting unit connection procedure (step S17). Assume that the output of the carrier sensing circuit 19 has not changed to "NO CARRIER" within a predetermined period of time or the receiving section 15 has not received a telephone call response signal within a predetermined period of time after the delivery of the connecting unit call signal. Then, the control section 13 executes, in place of the connecting unit connection procedure, a connecting unit NG procedure such as ringing a bell which is incorporated in the connecting unit 3 (step 18).

The conventional cordless telephone unit executes originating connection, as will be described with reference to FIGS. 3B and 4. Assume that the user of the cordless telephone unit has pressed the hook switch (off hook) to originate a call while the telephone set 4 is in a waiting state. Then, the control section 22 detects the off-hook (step 20, time T1), turns on the power switches 24 and 25 (step 21, time T2), designates a single control channel (step 22), and tunes the transmitting section 27 and receiving section 21 to the designated channel. Thereupon, the carrier sensing circuit 30 checks the designated control channel to see if a carrier exists thereon (step 23). If the resulting output of the carrier sensing circuit 30 is "NO CARRIER", the control section 22 turns on the transmitting section 27 (step 24, time T3) and controls the signal generating section 29 to send an originating call signal including the identification signal of telephone unit 4 to the connecting unit 3 (step 25, times T4 to T6). Afterwards, when the receiving section 21 receives an originating answer signal (step 26), the control section 22 executes an originating connection procedure (step 27). If the output of the carrier sensing circuit 30 does not change to "NO CARRIER" within a predetermined period of time or the receiving section 21 does not receive an originating answer signal (step 26), the control section 22 outputs a busy tone via the receiving section 21 and handset 13 (step 28).

When the wire telephone set 2 is connected to the telephone channel 1 to which the connecting unit 3 of the conventional cordless telephone unit is connected, the wire telephone set 2 rings first at all times on receiving an incoming call. Hence, as the user heard the wire telephone set 2 ringing presses the hook switch 26 of the cordless telephone set 4 (off hook), the connecting unit call operation (FIG. 3A) by the connecting unit 3 and the call originating operation (FIG. 3B) by the cordless telephone set 4 conflict. Specifically, as shown in FIG. 4, the connecting unit 3 sends a connecting unit call signal at the time T5 while the cordless telephone set 4 sends an originating call signal at the time T4. As a result, the connecting unit 3 and the telephone set 4 conflict and detect a carrier at the same time. Then, it is likely that both of the originating call and the connecting unit call fall into connection NG and, therefore, a lost connection.

A preferred embodiment of the cordless telephone apparatus in accordance with the present invention gives priority to originating connection when an originating and a connecting unit call signal conflict.

Figure 5A:
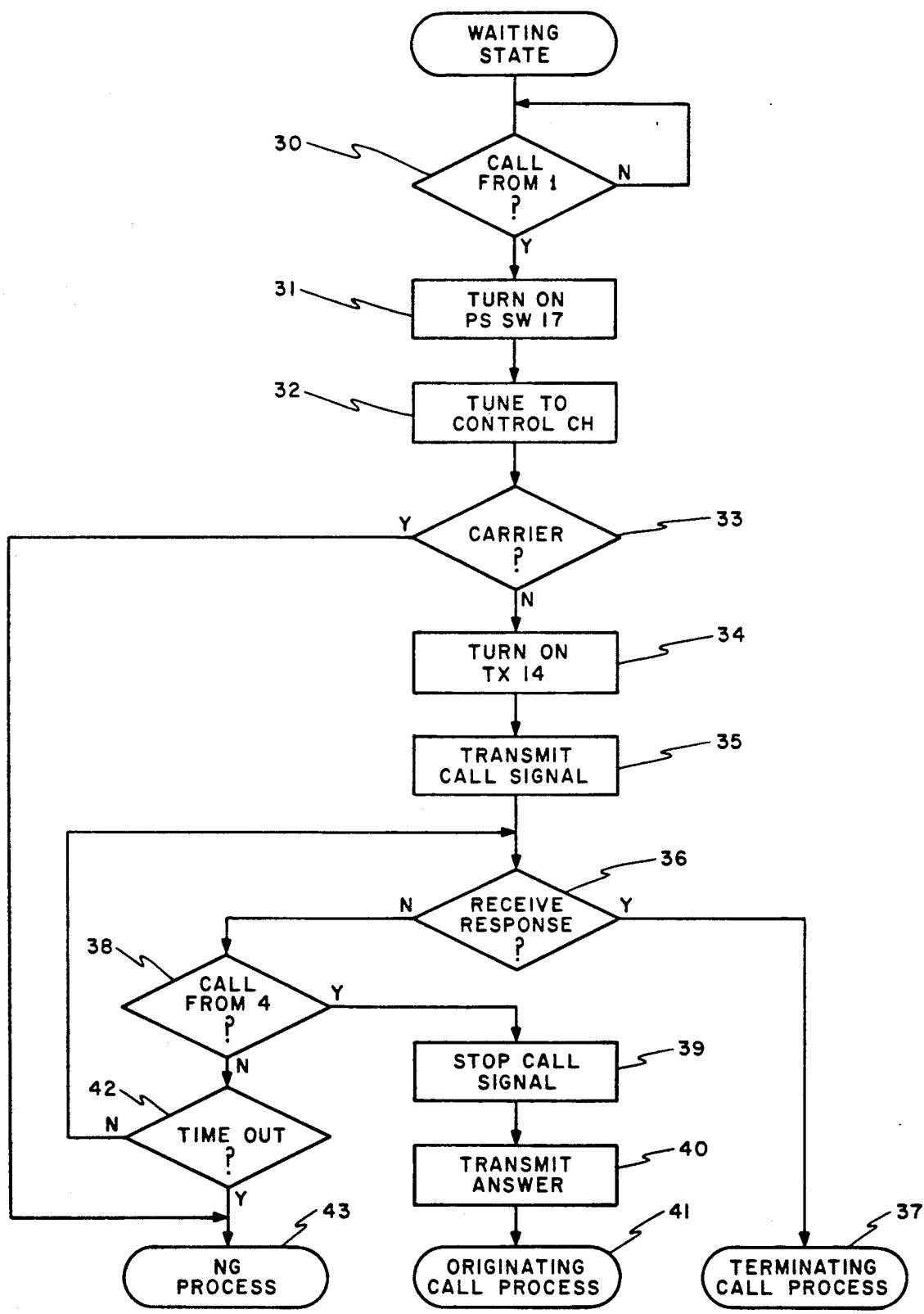
FIGS. 5A and 5B are flowcharts demonstrating respectively connecting unit connection and originating connection executed by a connecting unit and a cordless telephone set embodying the present invention.
Figure 6:
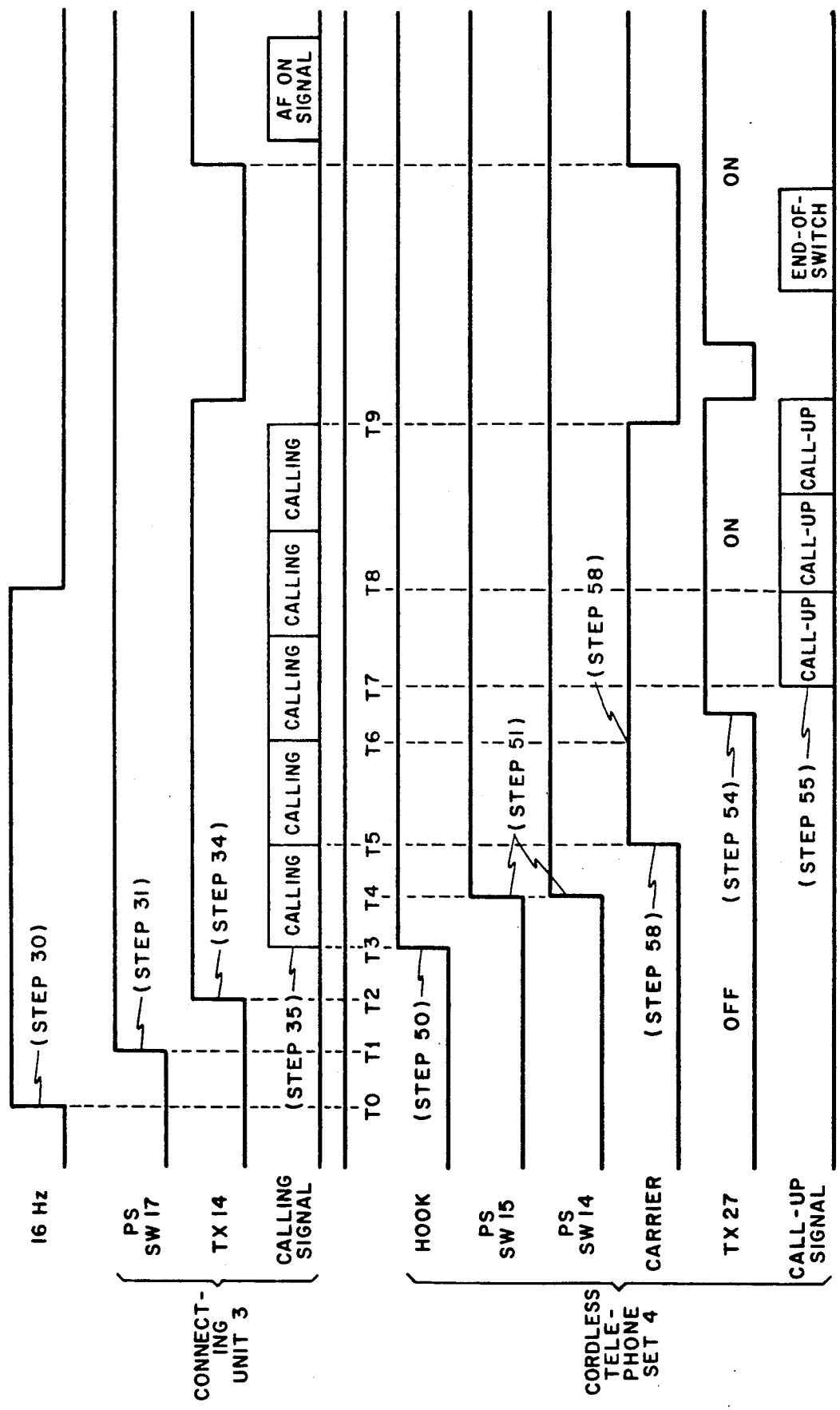
FIG. 6 is a timing chart representative of the conflict of a connecting unit call and an originating call particular to the illustrative embodiment.

A reference will be made to FIGS. 5A and 6 for describing connecting unit connection particular to the connecting unit 3 of the illustrative embodiment.

As shown, assume that the call incoming detective circuit 12 has detected a connecting unit call signal (step 30, time T0) while the connecting unit 3 is in a waiting state. Then, the control section 13 turns on the power switch 17 (step 31, time T1). At the same time, the control section 13 designates, among a plurality of voice channels and control channels assigned to the cordless telephone apparatus, a single control channel (step 32) and then switches the transmitting section 14 and receiving section 15 to the designated channel. In this condition, the carrier sensing circuit 19 checks the designated control channel to see if a carrier exists thereon (step 33). If the resulting output of the carrier detective circuit 19 is "NO CARRIER", the control section 13 turns on the transmission output of the transmitting section 14 (step 34, time T2) and controls the signal generating section 18 to send a connecting unit call signal to the cordless telephone set 4 via the transmitting section 14 (step 35, times T3 to T9). When the receiving section 15 receives a telephone response signal after the delivery of the connecting unit call signal (step 36), the control section 13 executes connecting unit connection (step 37). The sequence of steps described so far is the same as in the prior art shown in FIG. 3A.

Assume that the control section 13 has received via the receiving section 19 an originating call signal including an identification signal which is coincident with the identification signal assigned to the cordless telephone set 4 which should be connected to the connecting unit 3 (step 38, time 8). Then, the control section 13 controls the signal generating section 18 to stop the delivery of the connecting unit call signal (step 39), sends an originating answer signal to the telephone set 4 (step 40), and executes originating connection (step 41). When the output of the carrier sensing circuit 19 (step 33) does not change to "NO CARRIER" within a predetermined period of time or when a connecting unit call response signal is not received within a predetermined period of time after the delivery of the connecting unit call signal (step 42), the control section 13 executes a connection NG procedure (step 43).

Figure 5B:
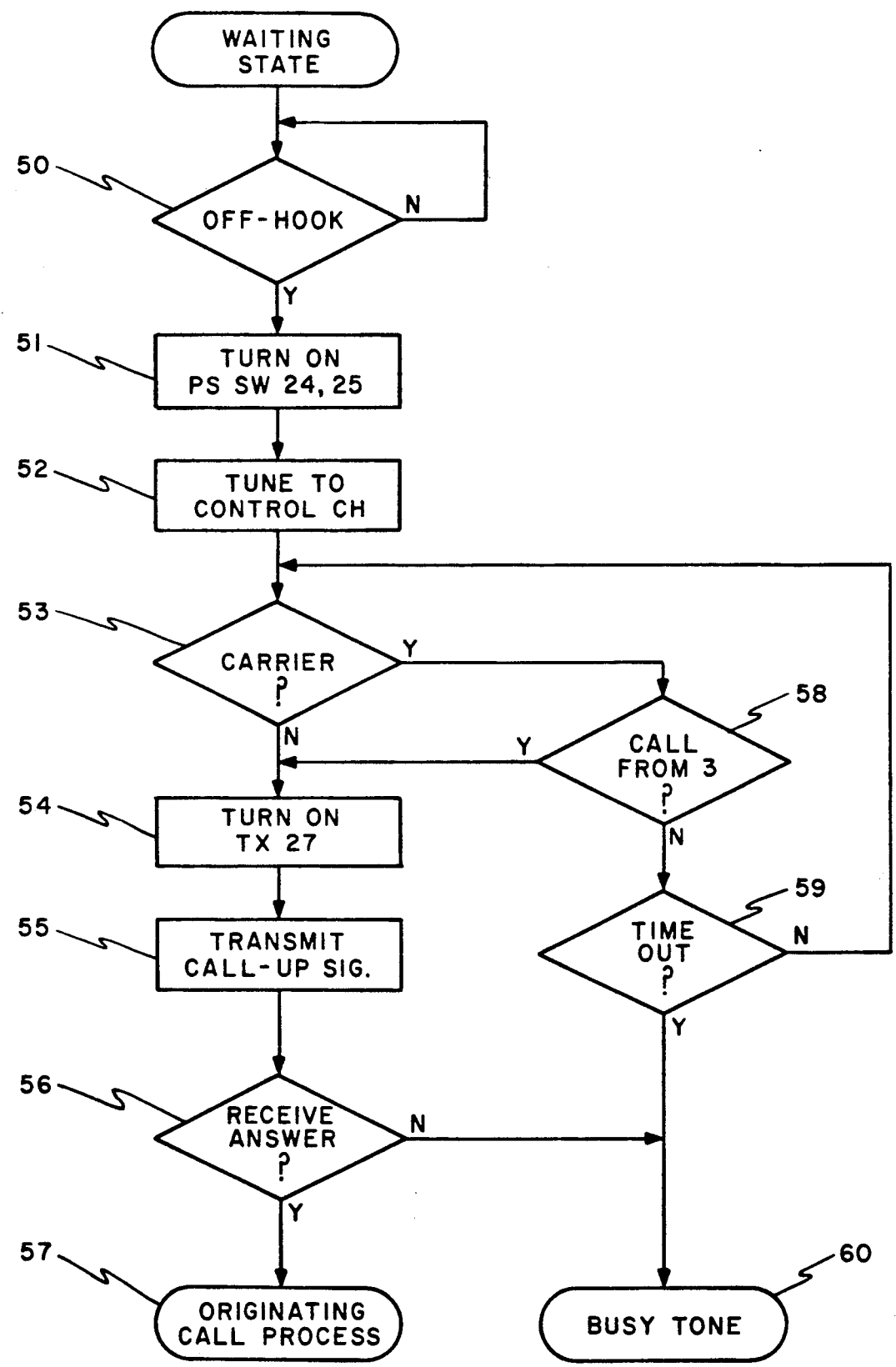

How the cordless telephone set 4 executes originating connection will be described with reference to FIGS. 5B and 6.

Assume that the user of the cordless telephone apparatus has pressed the hook switch 26 to originate a call (off hook) while the cordless telephone set 4 is in a waiting state. Then, the control section 22 detects it (step 50, time T3), turns on the power switches 24 and 25 (step 51, time T4), designates a single control channel (step 52), and tunes the transmitting section 27 and receiving section 21 to the designated channel. Subsequently, the carrier sensing circuit 30 checks the designated control channel to see if a carrier exists thereon (step 53). If the output of the carrier sensing circuit 30 is "NO CARRIER", the control section 22 turns on the transmitting section 27 (step 54) and controls the signal generating section 29 to send an originating call signal to the connecting unit 3 via the transmitting section 27 (step 55, time T7). When the receiving section 21 receives the originating answer signal (step 56), the control section 22 executes originating connection (step 57). The steps described so far are the same as in the prior art shown in FIG. 3B.

Assume that an identification signal coincident with that of the cordless telephone set 4 has been detected in the connecting unit call signal which is included in the received carrier (step 58, time T6). Then, even if the output of the carrier sensing circuit 30 is "CARRIER" (step 53, time T5), the control circuit 22 turns on the transmitting section 27 (step 54) and enters into a procedure for sending an originating call signal to the connecting unit 3 (steps 55 to 57). On the other hand, when the output of the carrier sensing circuit 30 does not turn to "NO CARRIER" within a predetermined period of time (steps 58 and 59) or when the receiving section 21 does not receive an originating answer signal within a predetermined period of time (N, step 56), the control section 22 causes the handset 13 to output a busy tone (step 60) and does not execute originating connection.

The conflict of an originating and a connecting unit call signal which may occur in the first embodiment and is an issue heretofore discussed will be described with reference to FIGS. 5A, 5B and 6.

On detecting a call incoming signal, the connecting unit 3 turns on the power switch 17 and then designates a control channel, detects a carrier, turns on the transmitting section 14, and sends a connecting unit call signal (steps 30 to 35). On the other hand, as the user heard the wire telephone set 2 ringing off-hooks the cordless telephone set 4, the telephone set 4 turns on the power switches 24 and 25 and then designates a control channel and detects a carrier (steps 50 to 53). At the time T5, the connecting unit 3 has already started sending a connecting unit call signal and, therefore, the cordless telephone set 4 produces "CARRIER". However, at the time T6, the connecting unit call signal having a coincident identification code is received (Y, step 58), so that the cordless telephone set 4 turns on the transmitting section 27 (step 54) and sends an originating call signal (step 55). At the time T8, the connecting unit 3 receives the originating call signal having the coincident identification code (Y, step 38) and, therefore, stops sending the connecting unit call signal (step 39), sends an originating answer signal for designating a voice channel of the cordless telephone set 4 (step 40), and tunes its own transmitting and receiving sections 14 and 15 to the designated voice channel (step 41). On receiving the originating answer signal (Y, step 56), the telephone set 4 switches the transmitting and receiving sections 27 and 21 to the designated voice channel and sends an end-of-switch signal (step 57). On receiving the end-of-switch signal, the connecting unit 3 sends an AF ON signal indicative of the completion of radio connection and thereby sets up a communicable state (step 41). On receiving the AF ON signal, the telephone set 4 is caused into a communicable state (step 57) to allow the user to converse with the other party.

As stated above, the illustrative embodiment causes the cordless telephone set 4 to send an originating call signal even in the "CARRIER" condition when it has detected a connecting unit call signal with a coincident identification signal. When the connecting unit 3 has detected an originating call signal while transmitting a connecting unit call signal, it sends an originating answer signal. As a result, when the originating call signal from the telephone set 4 and the connecting unit call signal from the connecting unit 3 conflict, priority is given to originating connection so as to successfully connect the telephone set 4 and connecting unit 3 to each other.

An alternative embodiment of the present invention which will be described gives priority to connecting unit connection in the event when an originating and a connecting unit call signal conflict. The alternative embodiment is also practicable with the circuitry shown in FIG. 2 except for the control systems of the control sections 13 and 22.

Figure 7A:
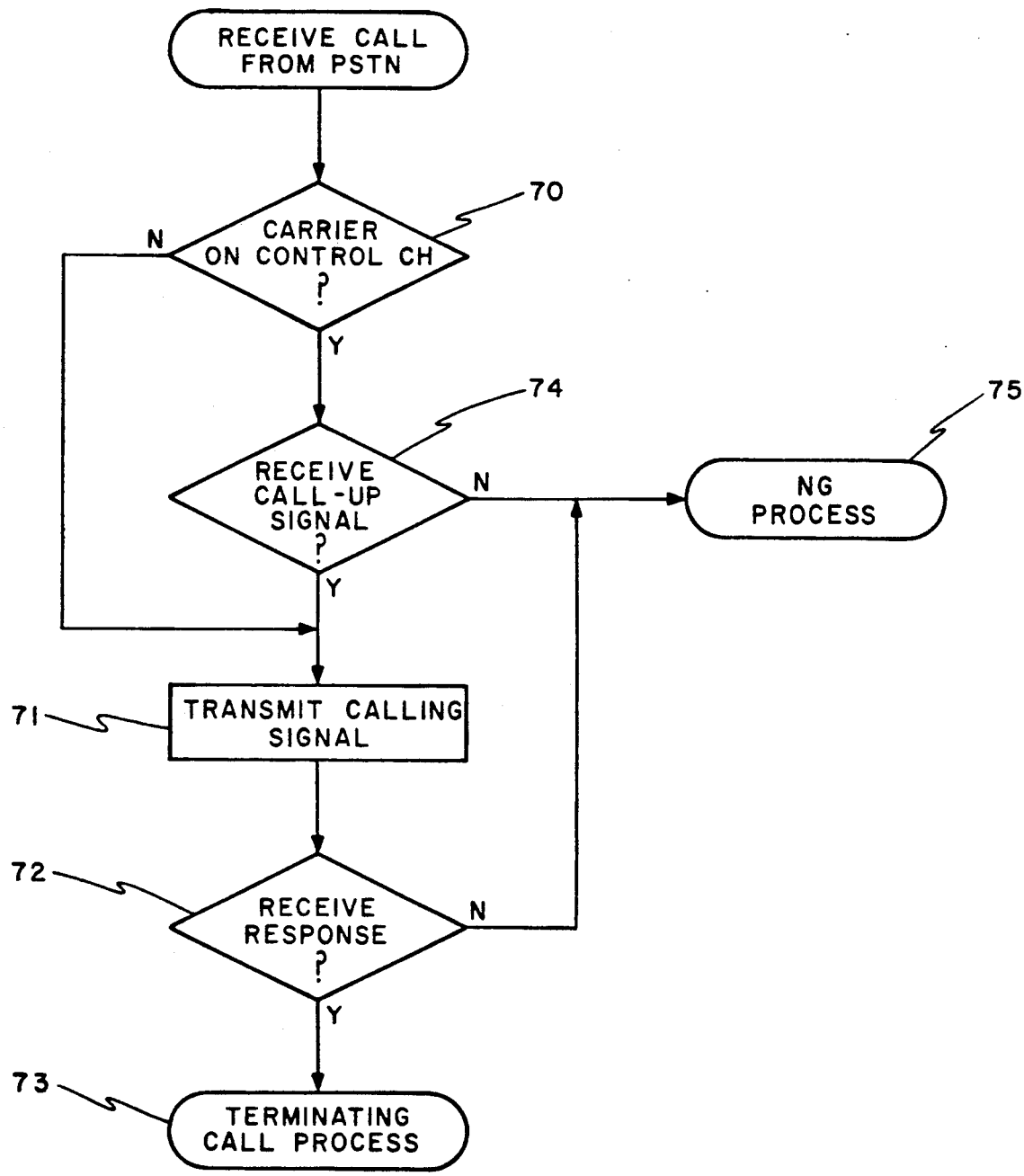
FIGS. 7A and 7B are flowcharts showing respectively originating connection and connecting unit connection executed by a connecting unit and a cordless telephone set representative of an alternative embodiment of the present invention.
Figure 7A:
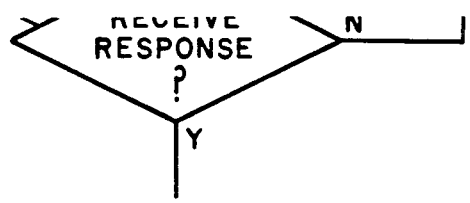

First, a reference will be made to FIG. 7A for describing a connecting unit connection flow to be executed by the connecting unit 3. Assume that the call incoming detective circuit 12 has detected a call incoming signal while in a waiting state. Then, the control section 13 turns on the power switch 17 and then designates a control channel and tunes the transmitting and receiving sections 14 and 15 to the designated control channel. When the carrier sensing circuit 19 produces a "NO CARRIER" signal associated with the designated control channel (N, step 70), the control section 13 turns on the transmitting section 14 and sends a connecting unit call signal to the cordless telephone set 4 via the transmitting section 14 by controlling the signal generating section 18 (step 71). Thereafter, when the receiving section 15 receives a telephone response signal from the telephone set 4 (step 72), the control section 13 executes terminating connection (step 73).

Assume that the output of the carrier sensing circuit 19 associated with the designated control channel is "CARRIER" (Y, step 70). Then, even if an originating call signal having a coincident identification signal (calling name) has been received (Y, step 74), the control section 13 neglects it and transmits the connecting unit call signal from the signal generating section 18 to the cordless telephone set 4 via the transmitting section 14 (step 71). When the receiving section 15 receives a telephone response signal (step 72), the control section 13 enters into the following connecting unit connection procedure (step 73).

The control section 13 executes the connection NG procedure (step 75) when it receives an originating call signal with a non-coincident identification signal via the receiving section 19 or when it does not receive a telephone response signal (N, step 72).

Figure 7B:
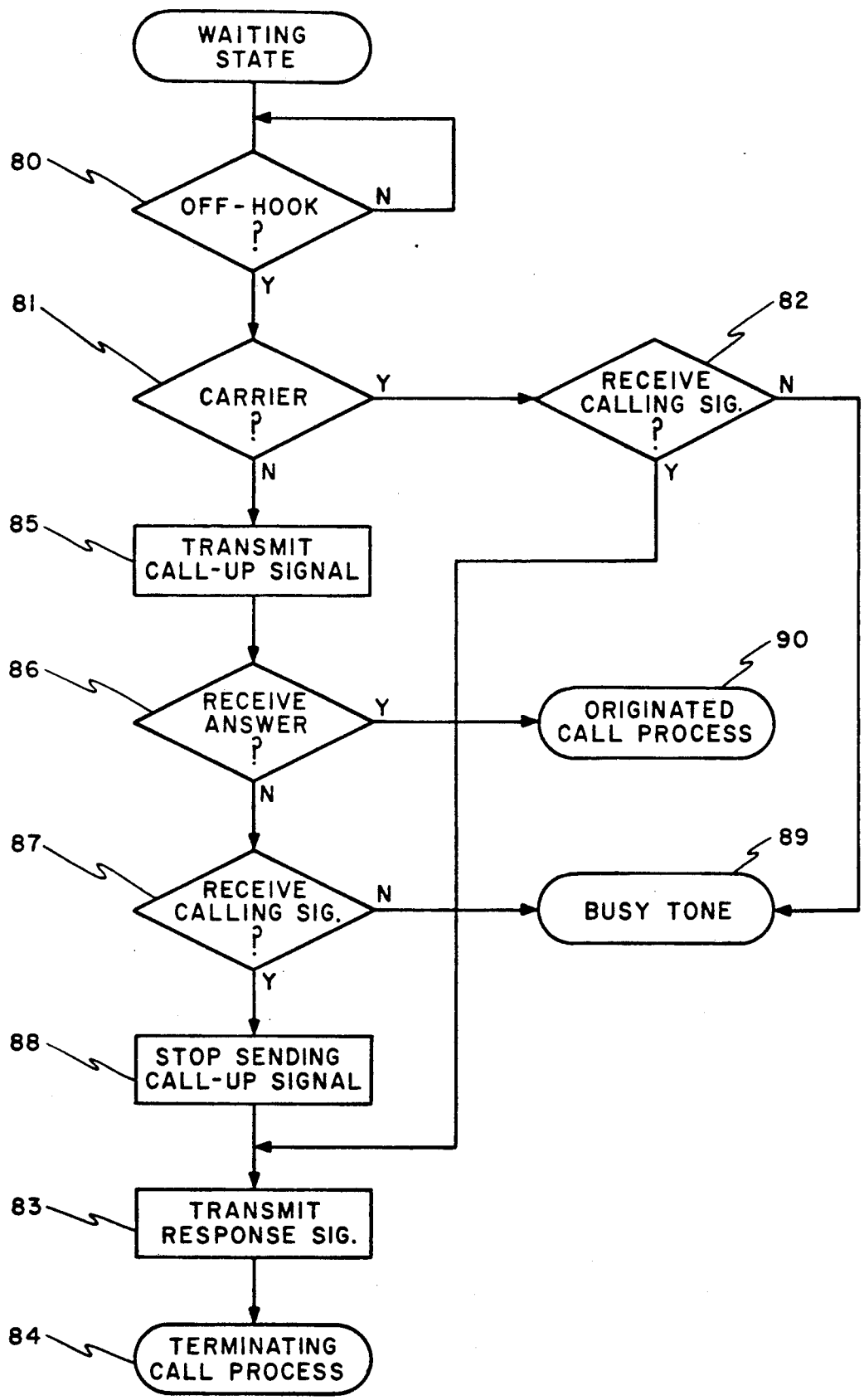

Originating and connecting unit call connection executed by the cordless telephone set 4 will be described with reference to FIG. 7B. When the control section 22 detects the off-hook of the hook switch 26 effected by the user of the cordless telephone set 4 (step 80), it turns on the power switches 24 and 25 and then designates a control channel and tunes the receiving and transmitting section 27 to that control channel. When the output of the carrier sensing circuit 30 is "CARRIER" (Y, step 81) and if it is representative of a connecting unit call signal with a coincident identification signal (Y, step 82), the control section 22 interrupts the originating connection procedure. At the same time, the control section 22 sends a telephone response signal to the connecting unit call signal to the connecting unit 3 via the transmitting section 27 (step 83) and then starts on the following connecting unit connection procedure (step 84).

Assume that the carrier sensing circuit 30 has produced a "NO CARRIER" output associated with the designated control channel (N, step 81) after the detection of the off-hook of the hook switch 26 (step 80). Then, the control section 22 turns on the transmitting section 27 and, thereafter, sends an originating call signal from the signal generating section 29 to the connecting unit 3 via the transmitting section 27 (step 85). When the receiving section 21 does not receive an originating answer signal to the originating call signal from the connecting unit 3 (N, step 86) and receives a connecting unit call signal with a coincident identification signal (Y, step 87), the control section 22 stops sending the originating call signal from the signal generating section 29 (step 88), sends a telephone response signal from the signal generating section 29 via the transmitting section 27 (step 83), and executes the following terminating connection (step 84).

When a connecting unit call signal with a non-coincident call number identification signal is received (N, step 82 or N, step 87), neither the originating connection nor the connecting unit connection is executed and, instead, a busy tone is outputted via the handset 13 (step 89). When a originating answer signal from the connecting unit 3 is received (Y, step 86), originating connection is executed (step 90).

In summary, the alternative embodiment shown and described provides the connecting unit 3 with connecting unit call signal priority sending means and provides the cordless telephone set 4 with telephone response signal priority sending means, so that connecting unit connection may be executed prior to originating connection when an originating and a connecting unit call occur substantially at the same time. This is successful in preventing both of the connecting unit and originating calls from resulting in loss connection.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. A connecting unit for use in a cordless telephone apparatus comprising:
    call incoming detecting circuit means for detecting a call incoming signal from a telephone channel;
    signal generating section means for generating a connecting unit call signal and an originating answer signal;

receiving section means for receiving an originating call signal and a telephone response signal from a cordless telephone set over a designated control channel;

carrier sensing circuit means included in said receiving section means;

transmitting section means; and control section means for designating a control channel when said call incoming detecting section means detects a call incoming signal, wherein said control section means transmits a connecting unit call signal from said signal generating section means via said first transmitting section when said carrier sensing circuit means produces a "NO CARRIER" output indicating that a carrier does not exist on said designated control channel, and wherein said control section means interrupts, when an originating call signal with a coincident identification signal is received from said receiving section means while the connecting unit call signal is transmitted, the transmission of said connecting unit call signal, controls said signal generating section means to send an originating answer signal to said originating call signal to said cordless telephone set via said transmitting section means, and executes originating connection.

2. A cordless telephone set for use in a cordless telephone apparatus, comprising:

signal generating section means for generating an originating call signal and a telephone response signal;

receiving section means for receiving a connection unit call signal and an originating answer signal from a connecting unit of said cordless telephone apparatus;

carrier sensing circuit means included in said receiving section means;

transmitting section means;

a handset; and control section means for designating a control channel on off-hook of said handset and, when said second carrier sensing circuit produces a "NO CARRIER " output indicating that a carrier does not exist on said designated control channel, sending an originating call signal via said transmitting section means and executing originating connection; said control section comprising originating connection priority processing means for controlling, even when said carrier sensing circuit means produces a "CARRIER" output indicating that a carrier exists on said designated control channel, said signal generating section means to send an originating call signal to said connecting unit via said transmitting section means if a terminating call signal with a coincident identification signal is received from said receiving section means.

3. A connecting unit for use in a cordless telephone apparatus, comprising:

call incoming detecting circuit means for detecting a call incoming signal from a telephone channel;

signal generating section means for generating a connecting unit call signal and an originating answer signal;

receiving section means for receiving an originating call signal and a telephone response signal from a cordless telephone set over a designated control channel;

carrier sensing circuit means included in said receiving section means;

transmitting section means; and control section means for designating a control channel when said call incoming detecting circuit means detects a call incoming signal and, when said carrier sensing circuit means produces a "NO CARRIER" output indicating that a carrier does not exist on said designated control channel, sending a connecting unit call signal from said signal generating section means via said transmitting section means, said control section means comprising connecting unit call priority processing means for sending, even when said carrier sensing circuit means produces a "CARRIER" output, the connecting unit call signal from said signal generating section means via said transmitting section means if an originating call signal with a coincident identification signal is received by said receiving section means and, thereafter, executing connecting unit connection when a telephone response signal is received via said receiving section means.

4. A cordless telephone set for use in a cordless telephone apparatus, comprising:

signal generating section means for generating an originating call signal and a telephone response signal;

receiving section means for receiving a connecting unit call signal and an originating answer signal from a connecting unit;

carrier sensing circuit means included in said receiving section means;

transmitting section means;

a handset; and control section means for designating a control channel on off-hook of said handset, sending an originating call signal via said transmitting section means when said carrier sensing circuit means produces a "NO CARRIER" output indicating that a carrier does not exist, and executing originating connection when said receiving section means receives an originating answer signal, said control section means comprising connecting unit call priority processing means for sending a telephone response signal from said signal generating section means via said transmitting section means when, during an interval between off-hook of said handset and reception of the originating answer signal, said carrier sensing circuit means produces a "CARRIER" output associated with said control channel and said receiving section means receives a connecting unit call signal with a coincident identification signal.

5. A cordless telephone apparatus comprising; a connecting unit connected to a telephone channel, and a cordless telephone set connectable to said connecting unit over a radio channel, said cordless telephone apparatus turning on a transmission output on confirming "NO CARRIER " on a control channel and connecting said radio channel only on confirming that the identification signals of said cordless telephone set and said connecting unit are coincident;

said connecting unit comprising means for interrupting, when an originating call signal with a coincident identification signal is detected during the course of transmission of a connecting unit call signal, the transmission of said connecting unit call signal and sending an originating answer signal to said cordless telephone set to execute originating connection;

said cordless telephone set comprising means for; sensing, when off-hook is detected in a waiting state, a carrier on said control channel; turning on the transmission output after "NO CARRIER" has been confirmed, and even in a "CARRIER" state turning on the transmission output if a connecting unit call signal with a coincident identification signal is detected and then transmitting an originating call signal to said connecting unit.

6. A telephone apparatus as claimed in claim 5, wherein said connecting unit and said cordless telephone set are connected to each other by said control channel and a plurality of voice channels.

7. A telephone apparatus as claimed in claim 5, wherein a wire telephone set is connected to said telephone channel to which said connecting unit is connected.

8. A cordless telephone apparatus comprising: a connecting unit connected to a telephone channel, and a cordless telephone set connectable to said connecting unit over a radio channel, said cordless telephone set turning on a transmission output on confirming "NO CARRIER" on a control channel and connecting said radio channel only on confirming that the identification signals of said cordless telephone set and said connecting unit are coincident;

said connecting unit comprising: connecting unit call signal priority sending means for sending a connecting unit call signal to said cordless telephone set prior to the execution of an originating answer signal transmission procedure when, in the even of call termination, a "CARRIER" condition of said control channel is detected and an originating call signal with a coincident identification signal is received from said cordless telephone set;

said cordless telephone set comprising: telephone response signal priority sending means for sending a telephone response signal prior to the execution of an originating connection procedure when, in the event call origination and during an interval between off-hook and reception of an originating answer signal from said connecting unit, a "CARRIER" condition is detected and a connecting unit call signal with a coincident identification signal is received from said connecting unit.

9. A telephone apparatus as claimed in claim 8, wherein said connecting unit call signal priority sending means comprises:

a signal generating section for generating the connecting unit call signal and the originating answer signal;

a receiving section for receiving an originating call signal with a coincident identification signal and the telephone response signal from said cordless telephone set;

a carrier sensing circuit included in said receiving section; and a control section for sending the connecting unit call signal from a first signal generating section via a first transmitting section when said carrier sensing circuit produces a "CARRIER" output associated with said control channel and said receiving section receives the originating call signal with a coincident identification signal.

10. A telephone apparatus as claimed in claim 8, wherein said telephone response signal priority sending means comprises:

a second signal generating section for generating the originating call signal and the telephone response signal;

a receiving section for receiving a connecting unit call signal with a coincident identification signal and the originating answer signal from said connecting unit;

a transmitting section; and a control section for sending the telephone response signal from said seconds second signal generating section via said transmitting section if a call is originated on said cordless telephone set and during an interval between off-hook and a reception of the originating answer signal by said receiving section.

11. A telephone apparatus as claimed in claim 8, wherein said connecting unit and said cordless telephone set are connected by said control channel and a plurality of voice channels.

12. A telephone apparatus as claimed in claim 8, wherein a wire telephone set is connected to the telephone channel to which said connecting unit is connected.

* * * * *